United States Patent
Takahashi

[11] 3,858,503
[45] Jan. 7, 1975

[54] STRAPPING MACHINE
[75] Inventor: Yukio Takahashi, Tokyo, Japan
[73] Assignee: Ikegai Tekko, Kabushiki Kaisha, Tokyo, Japan
[22] Filed: Mar. 13, 1973
[21] Appl. No.: 340,701

[30] Foreign Application Priority Data
Mar. 18, 1972  Japan .............................. 47-27603

[52] U.S. Cl. .............................. 100/33 PB, 100/26
[51] Int. Cl. .............................................. B65b 13/32
[58] Field of Search ............ 100/33 R, 33 PB, 26, 4; 53/198 R; 156/583

[56] References Cited
UNITED STATES PATENTS

| | | | |
|---|---|---|---|
| 3,269,300 | 8/1966 | Billett et al. ..................... | 100/33 PB |
| 3,368,323 | 2/1968 | Wood .............................. | 53/198 R |
| 3,397,105 | 8/1968 | Takami ........................... | 100/33 PB |
| 3,470,814 | 10/1969 | Tschappu ......................... | 100/33 PB |
| 3,494,280 | 2/1970 | Kobiella .......................... | 100/33 PB |
| 3,577,910 | 5/1971 | Feldkamp ........................ | 100/33 PB |
| 3,749,622 | 7/1973 | Sato et al. ........................ | 100/33 PB |
| 3,771,436 | 11/1973 | Kaisha ............................. | 100/33 PB |

*Primary Examiner*—Billy J. Wilhite
*Attorney, Agent, or Firm*—Woodhams, Blanchard and Flynn

[57] ABSTRACT

A strapping machine comprising: a table to place a package thereon disposed in the upper portion of a base section, being slidably supported by guide pieces; a band feeding device to feed a band in such a way that said band is fed and directed from the under side of said table upwardly through an opening, defined in the upper portion of said base section, in a direction perpendicular to the direction of movement of the table, so as to form a loop thereof encircling the table and the package and then directed toward the under side of the table again for the purpose to be clamped with the leading end portion of the band between the table and a clip means, and to draw back said band for tensioning thereof after the leading end portion of the band is clamped; a clip means installed under said table to clamp the leading end portion of the band with cooperation between the upper surface thereof and the lower surface of the table by rising itself upwardly toward the table with the intermediate of the leading end portion of the band; a heat sealing device adapted to melt the opposing surfaces of the overlapping portions of the tensioned band by means of a heat member attached to a press member mounted oscillatably to the base section in order to weld together the melted opposing surfaces of the overlapping portions of the band by pressing thereof with a press surface defined in the press member, and also adapted to cut the band at a point of the overlapping portions thereof positioning just under said heat sealing device after having been welded together by pressing; and a driving device to operate said table, clip means and heat sealing device.

1 Claim, 14 Drawing Figures

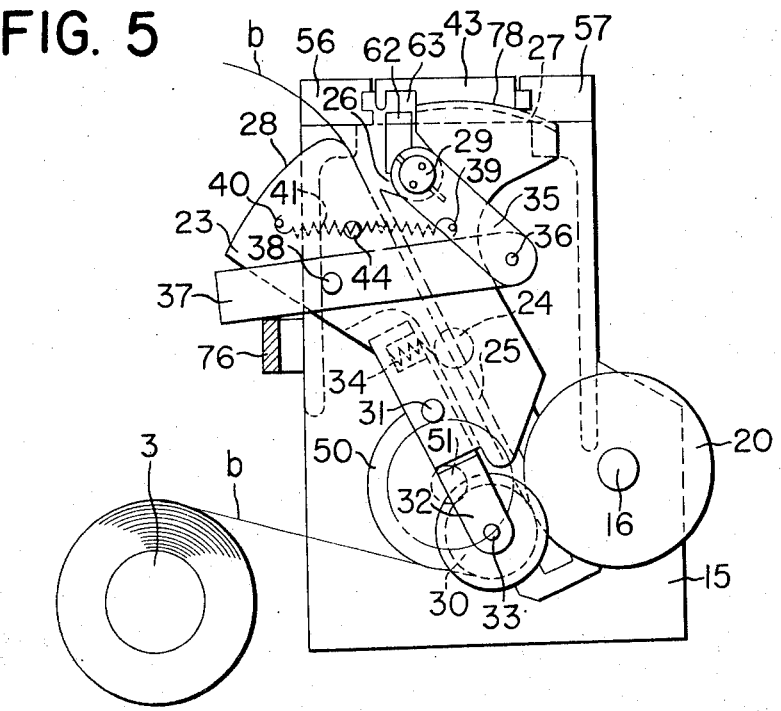
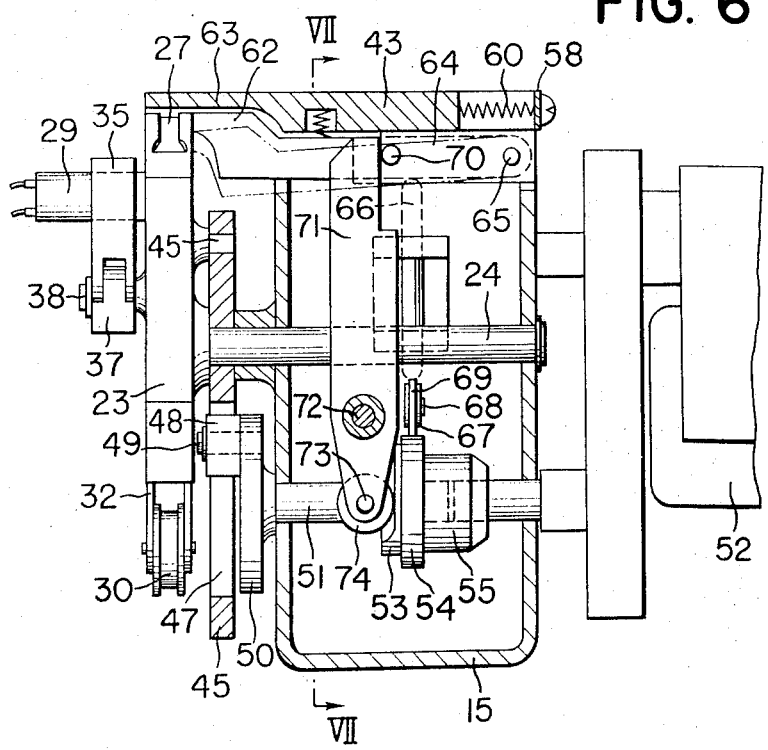

Patented Jan. 7, 1975　　3,858,503

STRAPPING MACHINE

FIELD OF THE INVENTION

This invention relates to such strapping machine that binds a package with a heat-sealing band.

DESCRIPTION OF THE PRIOR ART

The strapping machines heretofore used have various inconveniences. It was the aim of this applicant to remove these inconveniences when he developed a strapping machine shown in the specification and drawings of U.S. Pat. Ser. No. 277596 filed. This strapping machine, however, was not entirely devoid of some weakpoints since the machine did not simultaneously enable an operator to handle the machine with one hand and firmly hold a package with the other hand. This entails that since the package tended to waver during a strapping operation; and a band guide frame had to be installed to correctly align the band around the package in order to prevent the band from deviating due to some unbalanced camber, because the band cannot be guided by hand when it is wound around the package. This also tended to deteriorate the lapped joint of the band, or caused the collapse of a pile of objects when they are being strapped together into a package. It was these weakpoints that hampered desired simplification of its structure and facilitation of its operation.

SUMMARY OF THE INVENTION

It is an object of the present invention to provide such strapping machine which is without the heretofore noted weakpoints of the strapping machine developed by the applicant previously.

Yet another object of the invention is to provide a strapping machine whose heat-sealing device for clamping, welding and cutting the band is installed on one side of the base section, and the switches to control the function of the operating mechanism of the heat-sealing device are located at such point that they are close to the heat-sealing device and on the base section, so that an operator can hold a package with his hand and also with his other hand hold and insert the leading end of the band into the heat-sealing device. This eliminates the need of a band-guiding frame to be provided for preventing the deviation of band from the correct position around the package, thus contributing to the entailing simplification of the machine structure.

A still further object of the invention is to provide a strapping machine which enables a single operator, who is holding a package by one of his hands, to use free fingers of his another hand for operating switches and, after the switching operation, to guide the band being wound back with the same hand. This will prevent waver of the package during such winding back of the band, and possible deviation of the band, with a result of effecting the correct strapping of packages, and will also prevent the collapse of piled objects when they are being strapped together into a package.

It is likewise an object of the invention to provide a strapping machine which has a positioning plate mounted at such point that is close to the heat-sealing device and on the base section so that the positioning plate is engaged with the lower part of one side surface of the package, so as to enable the positioning plate to prevent the package from being moved during a strapping operation on the base section. This will permit the operator to temporarily leave the package unheld by his hand during operation without worry of failure in strapping operation, thus resulting in the higher work efficiency.

BRIEF DESCRIPTION OF THE DRAWINGS

FIG. 5 is an enlarged front view of the heat-sealing device included in FIG. 1.

FIG. 6 is a side view of FIG. 5 where, however, the press member is erected upright, and the heat-sealing device is viewed along a cutting plane line almost coinciding with the line of the casing.

DETAILED DESCRIPTION OF THE INVENTION

Figure 1:
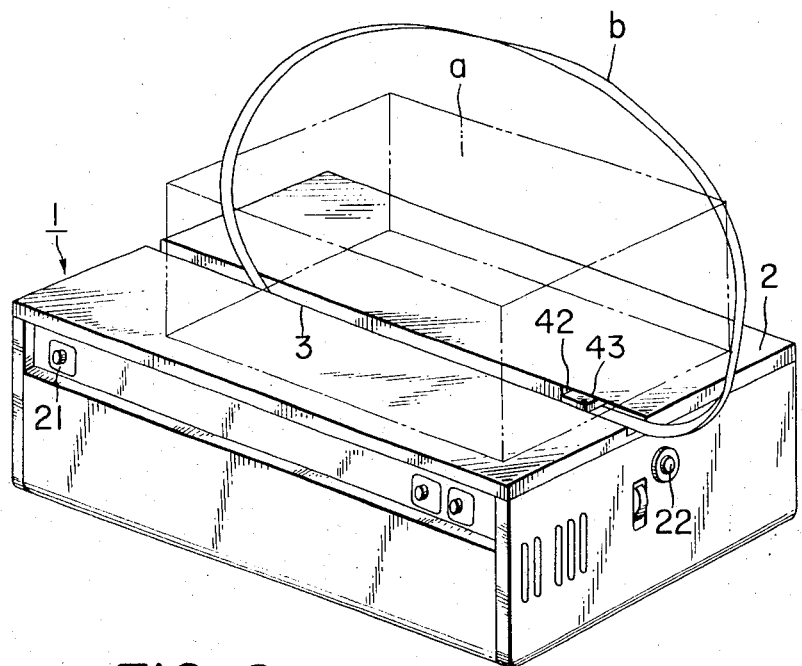
FIG. 1 is a perspective view of an embodiment of the invention.
Figure 2:
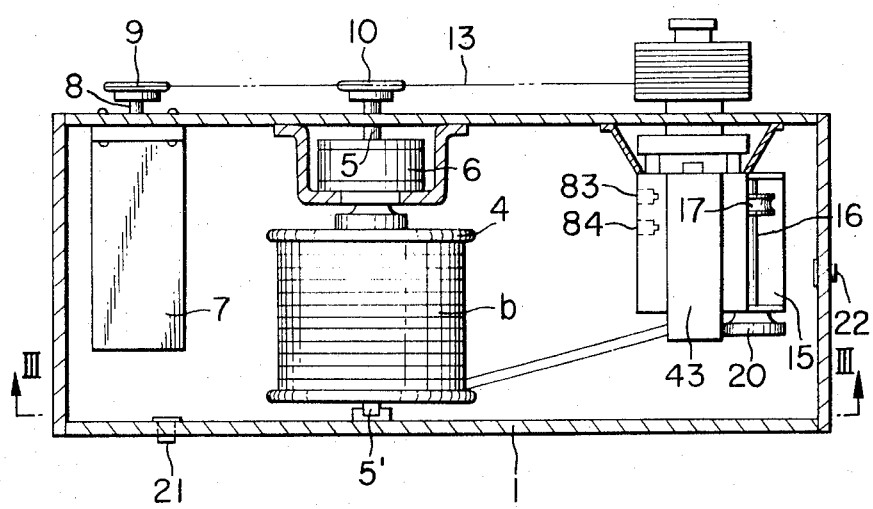
FIG. 2 is a plan view of FIG. 1 with the cutaway top plate.

The invention illustrated in the drawings generally comprises the band feeding device and the heat-sealing device.

First, the band feeding device is explained hereunder, by mainly referring to FIGS. 1 to 4.

The base section 1 has the top plate 2, which is provided with the groove 3 lying in the longitudinal direction. The opening 42 is made at such a location of said groove 3 that it is closer to one side of the base section 1. The reel 4, which winds the band b in the direction perpendicular to said groove 3, is mounted on the shaft 5–5' near the center and inside of the base section 1. Said shaft 5 is provided with the magnetic brake 6 which is released only when either the pushbutton switch 21 or the limit switch 84, to be referred to hereinafter, is actuated. The magnetic brake 6 functions to maintain the tensioning force of said reel 4. It is so devised that when the band b is used up, the reel 4 can be replaced with a new reel.

The reversible motor 7 is installed on the side opposite to said opening 42 and in said base section 1. The spindle 8 of said motor 7 is in parallel with said shaft 5–5' and is provided with the sprocket 9. The counter shaft 11, which is in parallel with said shaft 5–5' and spindle 8, is supported in the part lower than said opening 42 in said base section; and the chain 13 is mounted between said sprocket 9, the sprocket 10 which is installed on said shaft 5, and the sprocket 12 which is fixed on the shaft 11.

Figure 4:
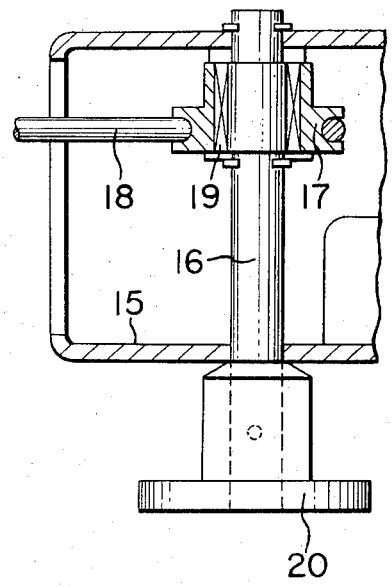
FIG. 4 is an enlarged longitudinal sectional view of the feed roller shaft of the band feeding device.

The belt 18 is stretched between the pulley 14 fixed on the shaft 11; and the pulley 17 is fixed on the feed roller shaft 16, which is supported on the casing 15 of the heat-sealing device to be referred to hereinafter. As illustrated in FIG. 4, the pulley 17 is mounted on the shaft 16 by means of the free-running clutch 19. The shaft 16 is provided with the feed roller 20. For continuously maintaining the tension of the band b between the roller 20 and the reel 4, the outside diameter of the feed roller 20 is so designed as to ensure that the peripheral speed of said feed roller 20 is slightly greater than that of the coil of the band *b* wound around said reel 4 when the coil is at maximum diameter. It is so devised that any difference between the speed of the feeding roller 20 of the band *b* and that of said reel 4 is absorbed by the slip of the belt 18 which is stretched between the pulleys 14 and 17. Said feed roller 20, however, does not revolve because of said free-running clutch 19, when the band b is being wound back.

Figure 9:
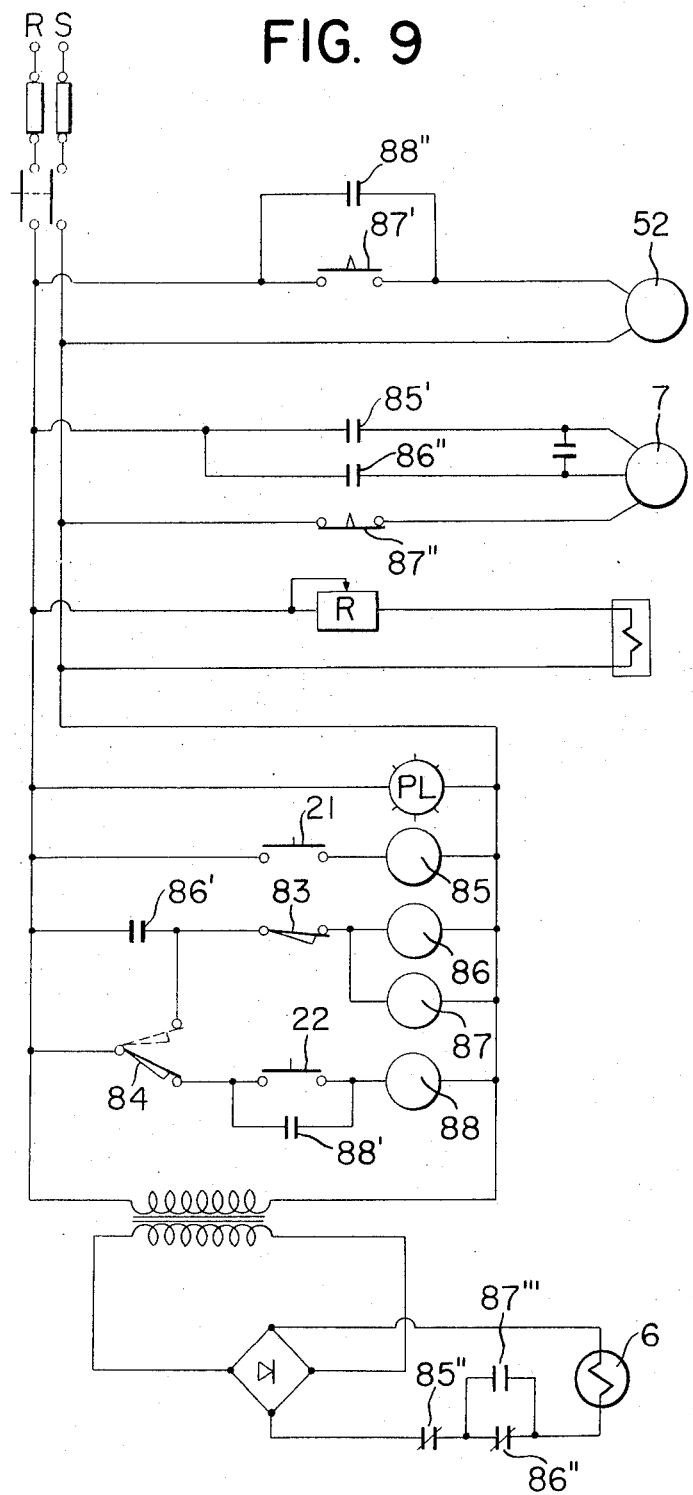
FIG. 9 is a sequential diagram of the control circuits.

The pushbutton switch 21 and the pushbutton switch 22 are installed respectively on the front of said base section 1 and on the side of said base section 1, the latter switch being adjacent to said opening 42. The control circuit including said two switches is as shown in FIG. 9, and functions thereof will be described in detail hereinafter. Said pushbutton switches 21 and 22, both of which serve for controlling said reversible motor 7 and the motor 52 to be referred to hereinafter, control the normal rotation and the reverse rotation, respectively, of said reversible motor 7.

Secondly, the heat-sealing device is explained hereunder.

Figure 3:
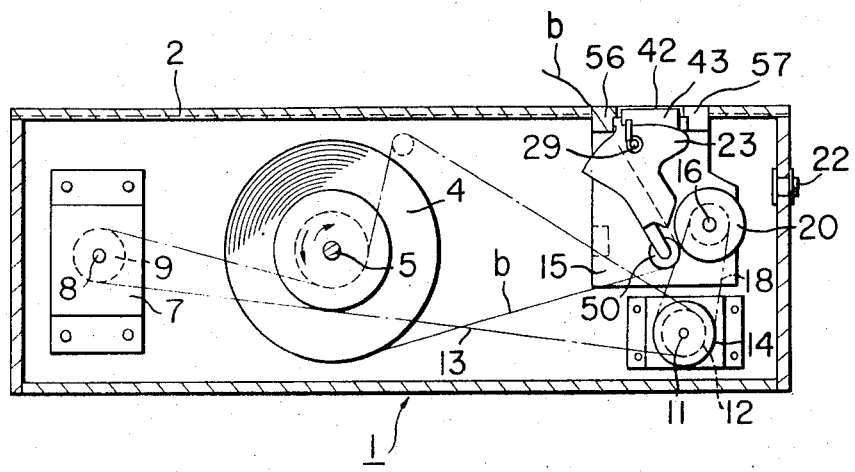
FIG. 3 is a sectional view taken along the line III—III of FIG. 2.

The heat-sealing device which is installed under said opening 42 in said base section 1, as shown in FIG. 3, is detailed in FIGS. 5 to 8.

Figure 7:
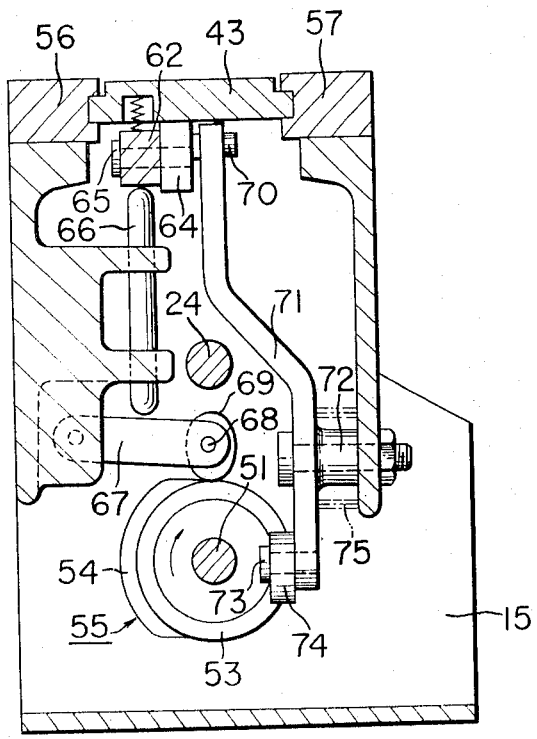
FIG. 7 is a sectional view taken along the line VII—VII of FIG. 6.

Referring to FIGS. 5, 6 and 7 the press member 23 is oscillatably supported by the shaft 24 in the front of the casing 15 fixed on the base section 1. The guide slot 25 to pass the band b through it is provided vertically in about the center of this press member 23, and the opening 26 of said guide slot 25 is provided in about the center of the top end of the press member. The groove 27 to guide the band b is formed on a part of the round surface of the top end of the press member as divided by the opening 26, while the opposite part of said round surface as divided by the opening 26 constitutes the press surface 28 to press two ends of the band *b*. These two parts of the round surface of the top end of the press member 23 constitute an arc centering around the center of the shaft 24, and the opening 26 is so devised as to hold the heater 29.

Figure 11:
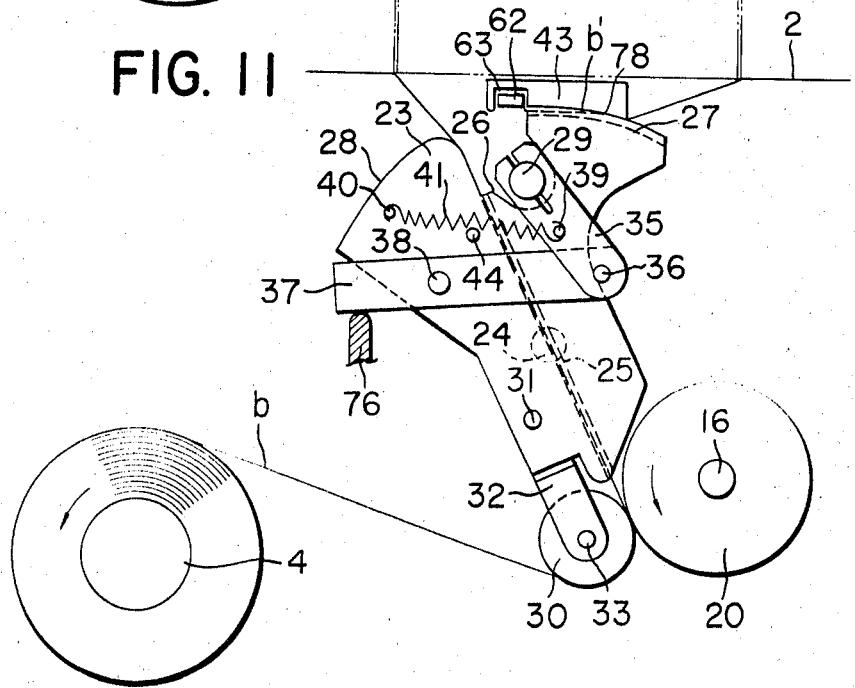

Near the bottom inlet of the guide slot 25, there is provided the flanged press roller 30 which is pivoted on the lever 32 by means of the pin 33, said lever 32 being pivoted on the press member 23 by means of the pin 31. This press roller 30 is pressed against the feed roller 20 by the working of the spring 34 only when it is in abeyance as shown in FIGS. 5 and 11.

The heater 29 is installed on the lever 35 which is pivoted on the lever 37 by means of the pin 36, while said lever 37 is pivoted on the press member 23 by means of the pin 38. And, the spring 41 is stretched between the pin 39 provided for the lever 35 and the pin 40 provided for the press member 23, whereby an ascending effort is imparted to the lever 37, while one end of the lever 37 is pushed against the stopper 76 fixed on a side wall of the casing 15 to thereby lower the lever 37 in definance of said ascending effort and have the heater 29 held on the bottom of the opening 26 of the press member 23. Besides, for the purpose of preventing the heater 29 from coming into direct contact with the bottom of the table 43 when the lever 37 is parted from the stopper 76, the pin 44 to restrict the ascent of the lever 37 is provided for the press member 23.

Referring to FIGS. 5, 6, 7 and 8, the back of the press member 23 is provided with the arm 46 having the slot 47 and fitted on the shaft 24 and the pin 45. The slide piece 48 slidably fits in this slot 47, and the pin 49 of said slide piece 48 is fixed on the disc 50. The shaft 51 of this disc 50 which is pivoted on the casing 15 and also connected with the cam and coupling 55 is rotated by the motor 52. With one rotation of this shaft 51, the press member 23 performs one oscillating cycle, whereby one stroke of strapping operation is completed.

Figure 8:
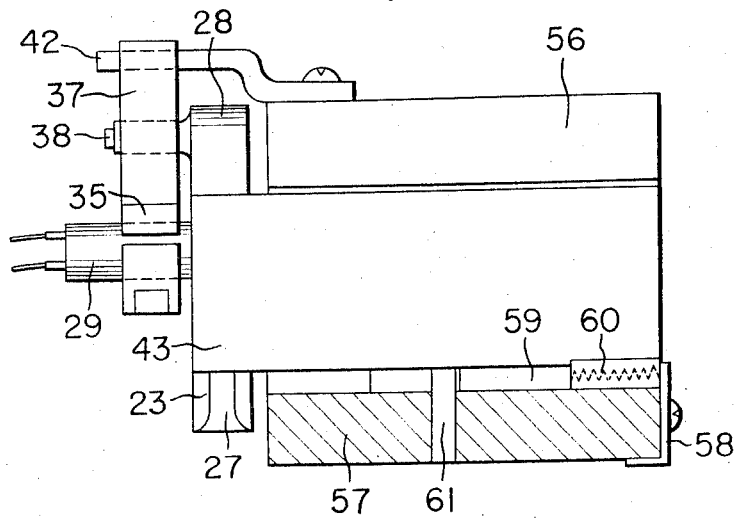
FIG. 8 is a partial plan view of FIG. 5.

Referring to FIGS. 6 and 8 the table 43 is slidably laid between the guide pieces 56 and 57 fixed on the top of the casing 15, and is devised to be pushed by the spring 60 disposed between the plate 58 fixed on the guide piece 57 and the projection 59 provided for the table 43 and advance until said projection 59 strikes the stopper 61 provided for the guide 57. When the table 43 has thus advanced, its front end is so located as to cover the top of the press member 23. And the bottom side of this table 43 is provided with an arched recess 78 on the underside of the table practically agreeing with the round surface of the top of the press member 23 and a groove in which the clamping clip 62 for the purpose of holding down the band *b* is to fit. A projection 64 is also fixed to this side.

The base end of the clip 62 is pivoted on said projection 64 provided for the table 43 by means of the pin 65, and the press rod 66 that moves vertically on the lower surface of the clip 62 is placed on the upper surface of a lever 67, and said lever 67 is pivotally supported on the casing 15, and the cam roller 69 is pivotally supported at the other end by means of the pin 68, and this cam roller 69 is engaged with the plate cam 54 fixed to the shaft 51 of the coupling 55 to move the clip 62 vertically.

The pin 70 is fixed on the projection 64 of the table 43, and the lever 71 whose upper part confronts the pin 70 is pivoted on the casing 15 by means of the pin 72. The cam roller 74 is pivoted on the lower end of this lever 71 by means of the pin 73, and said cam roller 74 is devised to be kept in contact with the surface of a face cam 53 which is fixed on the shaft 51 by means of the torsion spring 75 coiled round the pin 72. With the rotation of the cam 53, the lever 71 turns counterclockwise in FIG. 6.

Hereunder will be given an elucidation of the working of the present machine by reference to FIG. 9 and so forth.

Figure 10:
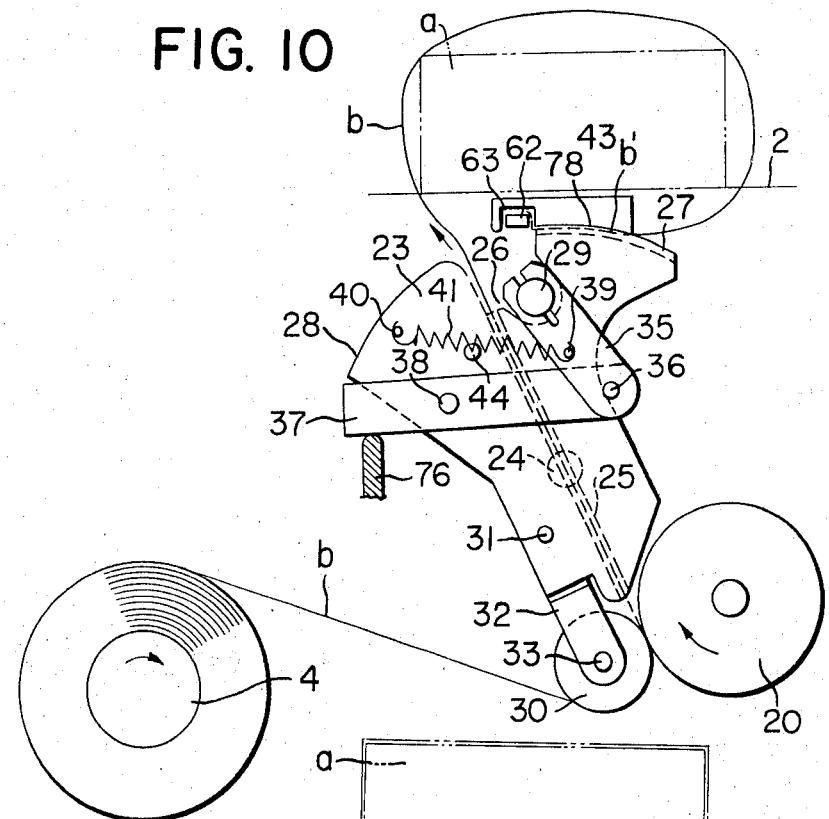
FIGS. 10 to 14 are explanatory drawings for the main part of FIG. 5 with its functions being illustrated sequentially.

FIG. 10 shows the state of the package a as put in a loop of the band b and laid on the top plate 2 of the base section 1. Prior to this, the press member 23 has come to a halt in the position as shown in the drawing, the clip 62 has descended to be open and the tip of band b has been suspended in the middle of the guide slot 25 of the press member 23.

At this, when said pushbutton switch 21 is depressed, said magnetic brake 6 is released, which in turn actuates the relay 85, whose contact 85' starts the normal revolution of said reversible motor 7. This revolution of said motor 7 causes said roller 20 and said reel 4 to rotate in their directions shown by their arrow marks. Then, the band b threads through the guide hole slot of the press member 23, passes via the recess 26 in the upper part of the press member 23, and thrusts out through one end of the opening 42 provided in the top plate 2. At this, the operator catches the thrusted band *b*, stretches it over said package *a*, which is placed on said top plate 2 of said base section 1 and on the table 43, and passes the leading end of the band b downward through another end of the opening 42. Thus, the operator guides the leading end of the band b to such point of said groove 63 of said table 43 that locates the leading end over the top of the clip 62, by extending it downward through a gap formed between the groove 27 and the undersurface of the table 43. At this, the operator depresses said pushbutton switch 22 by his free finger, thereby actuating the relay 88, so that through its contact 88″ the motor 52 of the heat-sealing device is energized. Said motor 52 in turn rotates the cam and coupling 55 in the direction of the arrow shown in FIG. 7, thereby causing the cam roller 69 engaged with the plate cam 54 to ride over the projected portion of the plate cam 54. This leads sequentially to raising of the lever 67, one end of which being pivoted on the casing 15, to raising of the press rod 66 placed on the lever 67, further to pushing up the clip 62 placed on the press rod 66, and finally to moving the top surface of said clip 62 and the undersurface of said table 43 to pinch the leading end of the band b between them.

FIG. 11 illustrates the state of the band b after it has been wound back. When said cam and coupling 55 completes an approximately 30° rotation, the limit switch 84 is thereby actuated and turned over to the position as shown in FIG. 9 by dotted lines, so that the relay 86 and the timer 87 are actuated. But the relay 88 returns to the original state. This entails that: the contact 88″ opens, the motor 52 stops, and the contact 86‴ causes the reversible motor 7 to revolve in the reverse direction, resulting in the reverse rotation of both the feed roller 20 and the reel 4, so as to wind back the band b for the period of time preset by the timer 87, thereby tightening the tension of the band b binding the package a. When the preset time is past, the contact 87″ of said timer 87 opens, said reversible motor 7 stops, and the contact 87‴ actuates the magnetic brake again so as to fix said shaft 5 of said reel 4 to sustain the tension. Although not illustrated, the tension is controlled by varying the voltage of said reversible motor 7.

Figure 12:
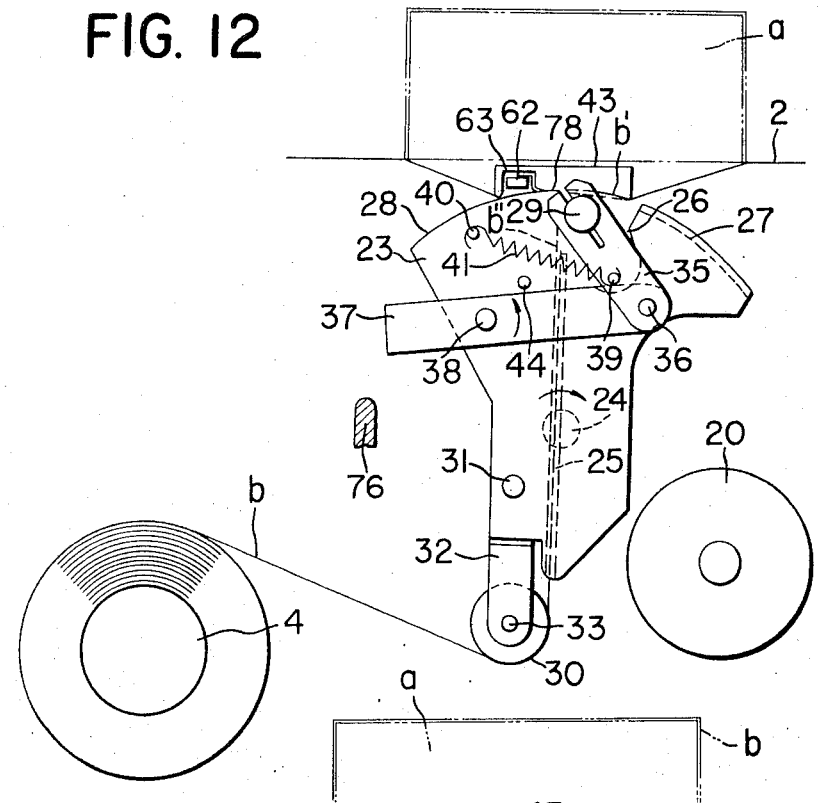

FIG. 12 illustrates the state where the press member 23 is in a pressing motion and the heater 29 is melting the band b. When the band b is tightened in said manner and said reversible motor 7 stops, then the contact 87′ causes said motor 52 to revolve again, rotating, in turn, the disc 50, thereby via the arm 46 swinging the press member 23 clockwise at a pivot on the shaft 24. When the swing removes the groove 27 from the table 43 and consequently from the band b, the lever 37 separates from the stopper 42 and swings counterclockwise on the pin 38 by the pulling force of the spring 41, until the lever 37 comes into engagement with the pin 44. The swing of said lever 37 raises the lever 35 pivoted on the lever 37 by means of the pin 36, lifting the heater 29 supported by said lever 35 till said heater 29 contacts the two lap members of the band b′ and b″, in the upper and lower positions respectively. Said heater 29 advances according to the swinging motion of the press member 23 while partially melting the lap members of the band b′ and b″, being closely followed by the press surface 28, which performs pressure-welding of said lap members of the band b′ to b″ while moving.

During the pressure-welding process, the reel 4 stands stationary, but the band b is fed automatically as much as the travel length of the press roller 30, which is installed under the press member 23, while the press roller 30 pivoted on the shaft 24 moves in the direction leaving from the feed roller 20.

Figure 13:
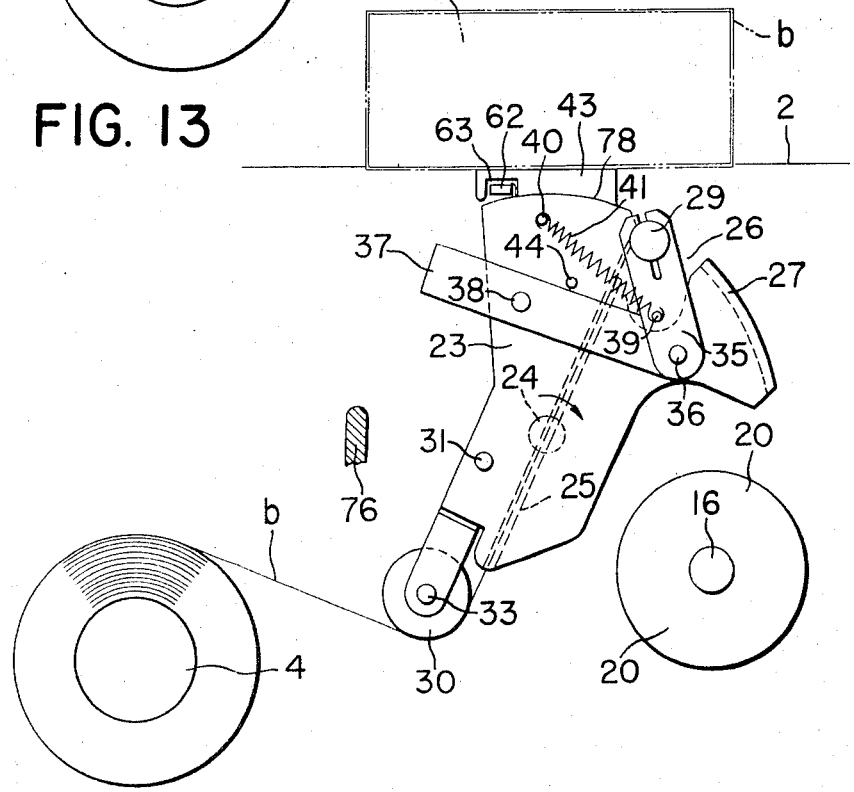

FIG. 13 illustrates the state where the band b has been completely welded. As described above, while the pressure-welding process of the band b proceeds, the travel of said press member 23 gradually slows down to increase the melted depth of the band b. When the speed of the press member has slowed down to a certain degree, the cam roller 69 rides over the root of the plate cam 54, causing the clip 62 to open. Then, the cam roller 74 rides over the crest of the face cam 53 so as to rotate the lever 74 clockwise on the pin 72, as illustrated in FIG. 6, thereby retracting said table 43 and said clip 62 via the pin 70 so that they will be slid off from between the undersurface of said package a and the top surface of the band b.

This retraction temporarily increases the tension of the band b to an extent where the band b becomes separated at its most deeply melted point.

Figure 14:
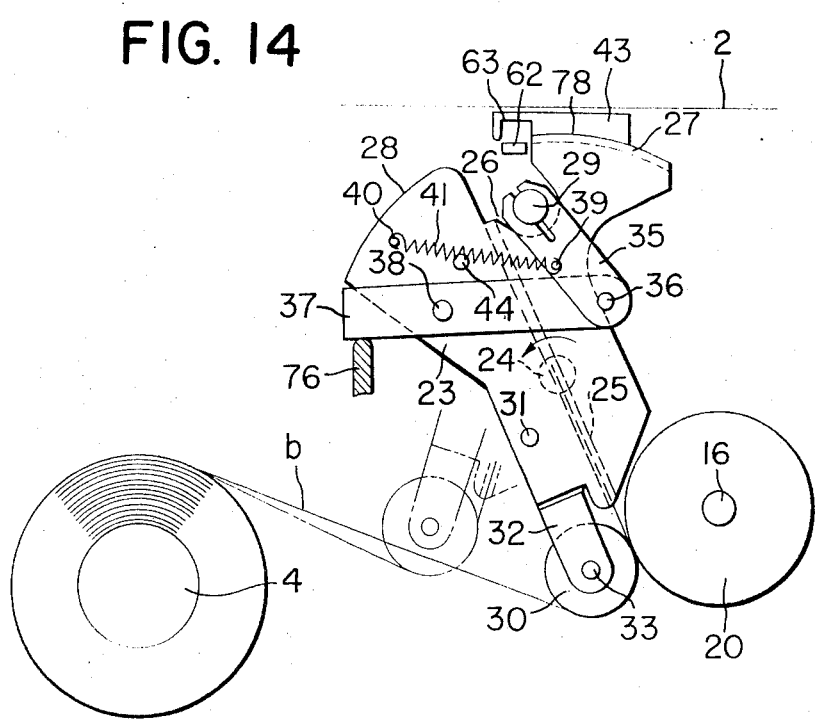

FIG. 14 illustrates the state where the press member 23 has completed its return movement. Since the timer 87 is retained by the relay 86, the motor 52 continues to revolve to cause the rotation of said disc 50. As said disc 50 rotates, the press member 23 rapidly swings, counterclockwise, in the direction reverse to the former direction. The lever 37, engaged with the stopper 42, pivots in the direction opposite to that in the pressing motion, thus lowering itself and the heater 29 supported on it, till it stops at the recess 26 of the press member 23.

At this, the lever 71 returns to the position illustrated in FIG. 6, thereby causing said table 43 and said clip 62 to advance again, the clip 62 descending also.

The band b located in the guide slot 25 of the press member 23 is pulled to as distant a point as the press roller 30 separates from the reel 4, because said press roller 30 returns from the position of the broken line to the continuous line as illustrated in FIG. 4, while said reel 4 remains stationary and does not feed. This pulling causes the new leading end of the band b to rapidly separate from the heater 29 and to be retracted to a location close to approximately the center of the guide slot 25. The shaft 51 opens the limit switch 83 and releases the circuits of the relay 86 and the timer 87, thus completing a full strapping process of band b for the package a. Another strapping process is to follow by the same procedure.

Reference is also made to Applicant's above-named copending application Ser. No. 277 596 wherein the operation of the press member and of the heat sealing device are explained in detail.

Although particular preferred embodiments of the invention have been disclosed hereinabove for purposes of illustration, it will be understood that variations or modifications thereof which lie within the scope of the invention as defined by the appended claims are fully contemplated. positioning plate.

What is claimed is:

1. In a strapping machine for securing a flexible band in surrounding relationship to an object, such as a package, said machine including a frame having a table slidably supported thereon, the table being adapted to have a package disposed on the upper surface thereof; clip means mounted on said frame for movement between open and closed position, said clip means including a movable clip portion disposed for coaction with the undersurface of said table for holding the leading end of a band therebetween when said clip means is in said closed position; a band feeding device associated with the table and disposed at least partially thereunder for feeding said band upwardly through an opening defined in the upper portion of the frame in a direction substantially perpendicular to the direction of movement of the table to form a loop surrounding the table and the package thereon, the band feeding device including means for drawing back the band for tensioning same after the leading end of the band has been clamped by said clip means; a heat sealing device for melting the opposed surfaces of overlapping portions of said loop and for pressing the melted overlapped portions together, said heat sealing device including a pressing member oscillatably mounted on said frame and a heat member mounted on said press member and positioned for engaging said band; and drive means drivingly connected to said table, said clip means and said heat sealing device for causing coordinated movements thereof, said drive means including a motor for controlling the movement of said heat sealing device; comprising the improvement wherein said frame includes a plurality of sidewalls, said heat sealing device being positioned within said frame adjacent one of said sidewalls, and a manually operated control switch mounted on said one sidewall and interconnected to said motor for controlling the energization thereof.

* * * * *